(12) United States Patent
Kiser

(10) Patent No.: US 11,441,728 B2
(45) Date of Patent: Sep. 13, 2022

(54) MOUNTING APPARATUS

(71) Applicant: Nicholas Kiser, High Point, NC (US)

(72) Inventor: Nicholas Kiser, High Point, NC (US)

( * ) Notice: Subject to any disclaimer, the term of this patent is extended or adjusted under 35 U.S.C. 154(b) by 0 days.

(21) Appl. No.: 17/153,695

(22) Filed: Jan. 20, 2021

(65) Prior Publication Data
US 2022/0228706 A1 Jul. 21, 2022

(51) Int. Cl.
| *F16M 11/00* | (2006.01) |
| *F16M 13/02* | (2006.01) |
| *B44C 5/02* | (2006.01) |
| *F16B 2/06* | (2006.01) |

(52) U.S. Cl.
CPC ............. *F16M 13/022* (2013.01); *B44C 5/02* (2013.01); *F16B 2/065* (2013.01)

(58) Field of Classification Search
CPC .......... F16M 13/022; B44C 5/02; F16B 2/065
See application file for complete search history.

(56) References Cited

U.S. PATENT DOCUMENTS

| 1,895,156 | A | * | 1/1933 | Fisher | B01L 9/50 |
| | | | | | 81/118 |
| 3,428,306 | A | * | 2/1969 | Harrison | B25B 5/147 |
| | | | | | 81/118 |
| 4,145,006 | A | | 3/1979 | Webb | |
| 6,828,035 | B1 | | 12/2004 | Goettl | |
| 7,048,242 | B2 | | 5/2006 | Oddsen, Jr. | |
| 7,448,548 | B1 | | 11/2008 | Chen et al. | |
| 9,273,821 | B2 | * | 3/2016 | Chang | F16M 11/041 |
| 9,972,221 | B2 | | 5/2018 | Raby | |
| 10,242,599 | B1 | * | 3/2019 | Herron | G09B 23/36 |
| 10,378,691 | B2 | * | 8/2019 | Allred | F16M 11/14 |
| 2017/0089507 | A1 | * | 3/2017 | King | F16M 11/12 |
| 2019/0275832 | A1 | * | 9/2019 | Eads | A01M 31/00 |

OTHER PUBLICATIONS

"Rack Bracket: Turning Heads", European Skull Mount, Cissna Park, Jan. 13, 2021, 2 pages, accessed at: https://www.rack-bracket.com/.
"Skull Hooker: Professionally Crafted Skull Mounting Solutions", Mar. 19, 2021, 3 pages, accessed at: https://www.skullhooker.com/.
"SkullMAX Original (3" Lag)—SkullMAX", Product Description, SkullMax LLC, Jan. 13, 2021, 2 pages, accessed at https://skullmax.com/product/skullmax-original-3-lag/.

* cited by examiner

*Primary Examiner* — Amy J. Sterling
(74) *Attorney, Agent, or Firm* — NK Patent Law

(57) ABSTRACT

A mounting apparatus for variably displaying an item includes a clamping device including a first jaw, and a cradle, the clamping device configured to adjustably decrease a distance between the first jaw and the cradle to apply a clamping force therebetween upon an item to be displayed. A swiveling device coupled to the clamping device is configured to selectively permit and prevent swiveling adjustment of a position of the clamping device independently of the distance between the first jaw and the cradle. The swiveling device, when loosened, permits three dimensional rotation adjustments of the clamping device. A three-member cradle has a second jaw opposite the first jaw, and a pair of laterally and diagonally extending shoulders.

16 Claims, 4 Drawing Sheets

MOUNTING APPARATUS

TECHNICAL FIELD

The present disclosure relates to mounts for display items. More particularly, the present disclosure relates to a mounting apparatus for variably supporting game skulls and heads prepared by taxidermy.

BACKGROUND

Hunting game is a time-honored tradition and craft often passed along by family ties with pride. Hunters often have game skulls cleaned of flesh, or prepared by taxidermy, for long-term keeping and displaying. While a mounting scheme can be as simple as a display board to which a display item is mounted by screws, offsetting a display item from such a simple board or wall better presents the item for viewing. If mounting is accomplished using currently available mounting systems that have fixed prongs or variable clamps, the condition of the display item is better preserved by eliminating the need to drill into bone and providing space from a wall or other host structure for antlers and such.

However, available fixed-prong systems do provide for adjustably orienting a display item, which may be preferred to instill senses of presence, mystique, and awe by directing the display item to effectively face any desired direction. Furthermore, available adjustable systems that utilize a single locking device, such as a tensioner between a rearward ball joint and forward jaws, may put the display item at risk of dropping and damage when the tensioner is loosened to permit orientation adjustment. Moreover, a simple two-jaw clamp focuses concentrated force upon limited bone areas, which can crack the display item.

An improved mounting apparatus is needed.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a mounting apparatus for variably displaying an item, the mounting apparatus includes: a clamping device including a first jaw, and a cradle, the clamping device configured to adjustably decrease a distance between the first jaw and the cradle to apply a clamping force therebetween upon an item to be displayed; a swiveling device coupled to the clamping device and configured to selectively permit and prevent swiveling adjustment of a position of the clamping device independently of the distance between the first jaw and the cradle.

The cradle may include a second jaw that opposes the first jaw, and a pair of lateral shoulders that are symmetric about the lower jaw.

The lateral shoulders may be inclined.

The lateral shoulders may diverge defining a fork that widens.

The clamping device may include a support post along which the cradle is adjustably movable, and the first jaw may be connected the support post.

The support post may be received through a hole of the cradle thereby mounting the cradle to the support post.

A nut may be mounted on a threaded portion of the support post, with the nut rotatable on the support post to adjustably decrease the distance between the first jaw and the cradle to apply a clamping force therebetween.

The support post may be connected to the swiveling device, with the nut mounted on the support post between the swiveling device and cradle.

In at least one example, the swiveling device, when loosened, permits three dimensional rotation adjustments of the support post.

In at least one example, the swiveling device, when tightened, locks a position of the support post.

The swiveling device may include a swivel element shaped outwardly as at least a partial sphere, and the support post may be connected to the swivel element.

The swiveling device may include a cup, a cap adjustably engaging the cup, and a swivel element trapped between the cup and the cap, with the clamping device connected to the swivel element.

The swivel element may be shaped outwardly as at least a partial sphere, with at least one of the cup and the cap including a concave inner contact surface for engaging the swivel element.

The cap may include a flange having a central circular opening through which a support post of the clamping device extends.

In at least one example: the cup and cap are threadingly engaged; and the cup and cap can be loosened and tightened about the swivel element by relative rotation.

In at least one example, the swiveling device, when the cup and cap are loosened, permits three dimensional rotation adjustments of the clamping device; and the swiveling device, when the cup and cap are tightened, locks a position of the clamping device.

The mounting apparatus may include a base assembly having: a mounting plate for attachment to a host structure; and a bracket extending from the mounting plate, with the swiveling device being connected to and supported by the bracket, and the clamping device being supported by the swiveling device.

The above summary and all descriptions of features below are to be understood as cumulative and inclusive. The described embodiments and features can be combined in various combinations, in whole or in part, in one or more other embodiments.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
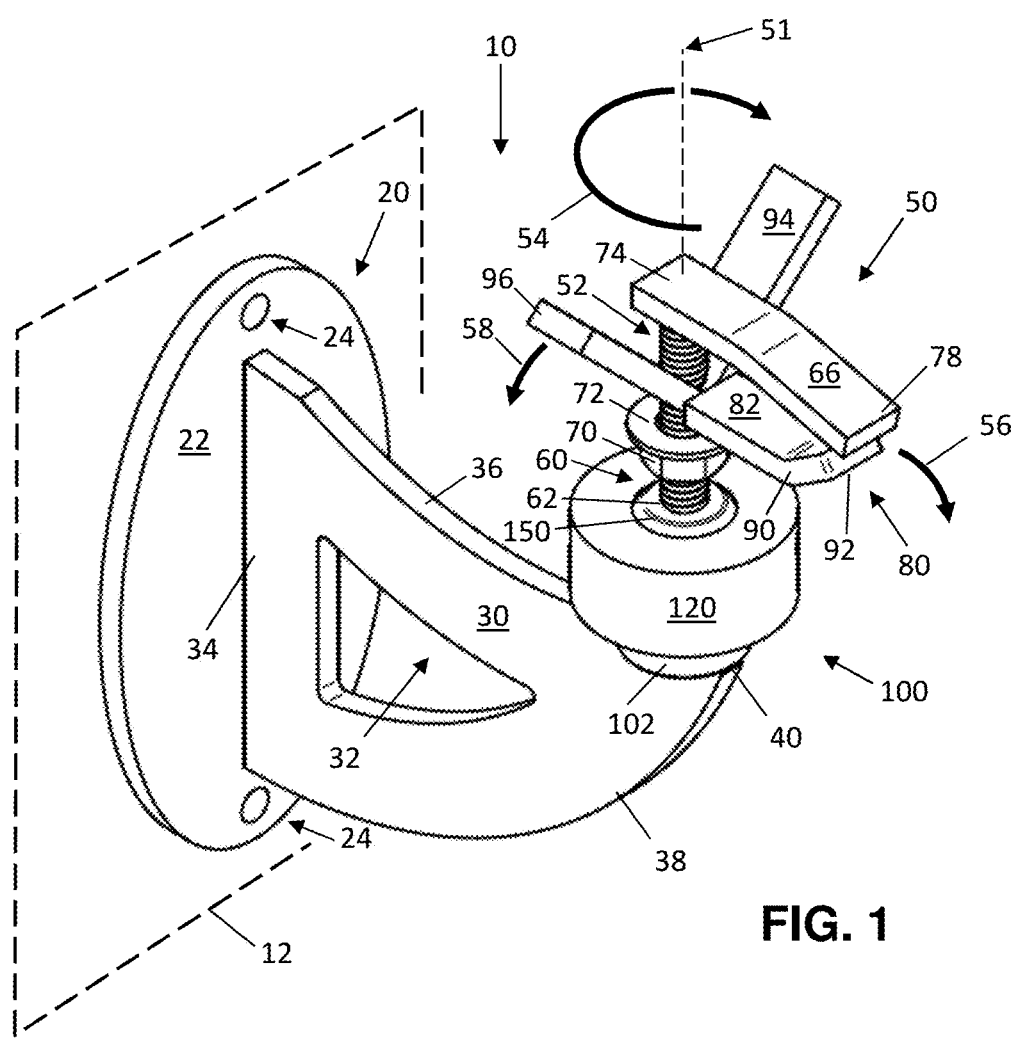
FIG. 1 is a perspective view of a mounting apparatus, according to at least one embodiment, for mounting a display item such as a game skull.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Figure 2:
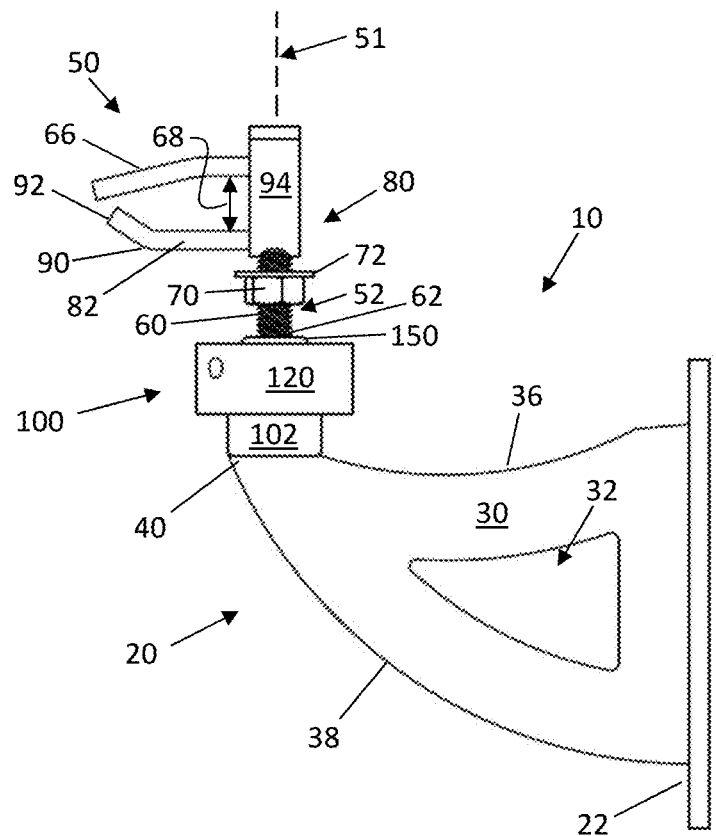
FIG. 2 is a side elevation view of the mounting apparatus of FIG. 1, showing the clamping device thereof coupled to the swivel device thereof.

A mounting apparatus 10, according to at least one embodiment, is shown in FIGS. 1-2. The mounting apparatus 10 is useful for variably supporting a display item such as a game skull or head prepared for display by a taxidermist. The particularly illustrated mounting apparatus 10 has features particularly suited for the skull or head of a deer. As different animal anatomies have bone structures bearing both similarities and differences, the illustrated mounting apparatus 10, and variations thereof within the scope of these descriptions, can be used for supporting and displaying the skull or head of a deer, and other game animals and items.

The mounting apparatus 10 has a base assembly 20, a swiveling device 100 mounted on and supported by the base assembly 20, and a clamping device 50 coupled to and supported by the swiveling device 100. Advantageously, the ball-in-cup coupling of the clamping device 50 to the swiveling device 100 permits the orientation of the clamping device 50 to be adjusted through at least three dimensions of rotation as represented in FIG. 1 by yaw rotation 54 around a support axis 51, and by tilt adjustment of the support axis 51 by separate pitch rotation 56 and roll rotation 58. The orientation of a skull mounted on the clamping device 50 can thereby be adjusted to suit aesthetic preferences. Thus, a mounted skull can be oriented to appear to face the center of a room, oriented to appear to face downward into a viewing area from a high-mounted position high on a wall, and oriented to appear to face a flat or horizontal vector when mounted on a wall at, for example, standing height.

The base assembly 20 includes a mounting plate 22 by which the mounting apparatus 10 is to be attached to a wall, column, or other host structure 12 (represented in dashed-line in FIG. 1). In the illustrated example, the mounting plate 22 has an oval shape and holes 24 to receive fasteners such as screws or nails. A bracket 30 extends forward perpendicularly from the mounting plate 22 to support the swiveling device 100 a distance from the wall or other host structure 12 on which the mounting apparatus 10 is mounted. In the illustrated example, the bracket 30 is formed as an arcuate plate having a decorative three-edged outer shape and an internal cutout 32 decoratively mimicking the outer shape. In particular, the bracket 30 has a linear rearward edge 34 connected to the mounting plate 22, an arcuate upper edge 36 extending generally outward from the mounting plate 22, and an arcuate lower edge 38 converging with the upper edge 36 at the forward end 40 of the bracket 30 opposite the rearward edge 34. The mounting plate 22 and bracket 30 can be formed, for example, of steel plate material, that is, for example laser cut or stamped. The bracket 30 can be connected to the mounting plate 22, for example, by welding along the rearward edge 34.

The clamping device 50 includes a support post 52 by which the clamping device 50 is coupled to and supported entirely by the swiveling device 100. The support post 52 extends generally upward from the swiveling device 100 within a solid angle and orientation range defined by the three dimensional rotation adjustments represented in FIG. 1 as yaw rotation 54, pitch rotation 56, and roll rotation 58. The support post 52 is shown as vertical in relation to the host structure 12 (FIG. 1) for mere convenience and illustration. The central axis of the support post 52 defines the support axis 51 referenced in FIGS. 1-2.

External threads 60 of the support post 52 facilitate fixed engagement with the swiveling device 100 at the lower end 62 of the support post 52. A cradle 80 (FIG. 5) is adjustably movable along the support post 52. A first jaw, referenced as an upper jaw 66, is connected to a terminal upper end of the support post 52 opposite the lower end 62. The upper jaw 66 is spaced from the cradle 80 according to the position of the cradle 80 along the support post 52. Adjustment of the position of the cradle 80 along the support post 52 adjusts the space between the upper jaw 66 and cradle 80 and provides clamping force between the cradle 80 and upper jaw 66 to forcibly engage and retain an item for display such as a deer skull. The cradle 80 can move along the support post 52 between the upper jaw 66 and a nut 70 mounted on the support post 52 and engaging the external threads 60 of the support post 52 below the cradle 80. A washer 72 is positioned on the support post 52 between the cradle 80 and nut 70. The nut 70 can be turned to tighten and loosen the clamping force of the clamping device 50, between the cradle 80 and upper jaw 66, on the bony structure of a mounted skull or other display item.

Figure 3:
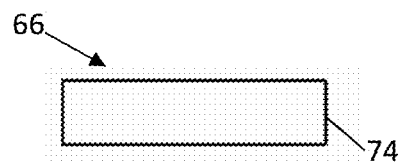
FIG. 3 is a top view of an upper jaw of the clamping device of the mounting apparatus of FIG. 2.
Figure 4:
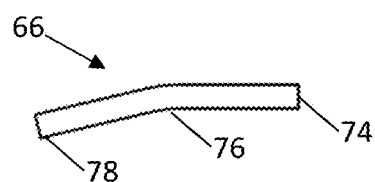
FIG. 4 is a side view of the upper jaw of the clamping device FIG. 3.

The upper jaw 66 is illustrated in FIGS. 1 and 3-4, as having a proximal end 74 connected to the terminal upper end of the support post 52, a central portion having a downward bend 76, and a distal end 78 extending outward from the support post 52 and angled downward toward the cradle 80 according to the bend 76.

Figure 5:
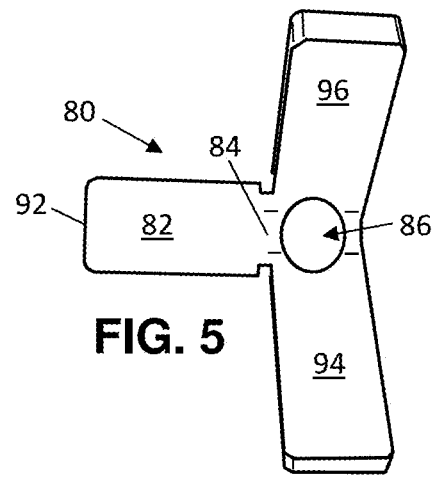
FIG. 5 is a top view of a cradle of the clamping device of FIG. 3.

The cradle 80, as illustrated in FIGS. 1 and 5, provides a second jaw, referenced as the lower jaw 82, that generally opposes the first or upper jaw 66 in use. The lower jaw 82 has a proximal end 84 in which a through-hole 86 is formed for receiving the support post 52 thereby mounting the cradle 80 to the support post 52. The lower jaw 82 has a central portion having an upward bend 90, and a distal end 92 extending outward from the support post 52 and angled upward toward the upper jaw 66 according to the bend 90. A pair of inclined left and right lateral shoulder members 94 and 96 are symmetric about the proximal end 84 of the lower jaw 82, diverging upward, and together defining a fork that widens upward toward the upper jaw 66. The left or first shoulder member 94 extends laterally and upward from the proximal end 84 of the lower jaw 82. The right or second shoulder member 96 extends laterally oppositely the first shoulder member 94 and also upward from the proximal end 84 of the lower jaw 82. The cradle 80 can thus be described as a three-member cradle 80, with the lower jaw 82 defining a forward member thereof, and the shoulder members 94 and 96, each defining a laterally and diagonally extending member thereof.

The upper jaw 66 and cradle 80 can be formed, for example, of steel plate material, that is, for example laser cut or stamp cut, and bent to final form. For example, the cradle 80 can fabricated from stock plate material in planar form with the through-hole 86 sized to account for reduction upon bending the cradle 80 to its final form, which may reduce the effective hole dimensions. In the assembled clamping device 50, the effective hole dimensions are to permit the cradle 80 to move along the support post 52 as the clamping device 50 is tightened and loosened.

Figure 8:
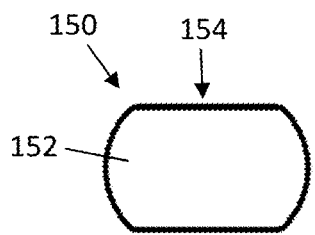
FIG. 8 is an elevation view of a swivel element of the swiveling device of FIG. 2.
Figure 9:
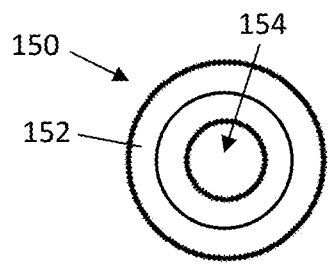
FIG. 9 is a top view of the swivel element of FIG. 8.
Figure 10:
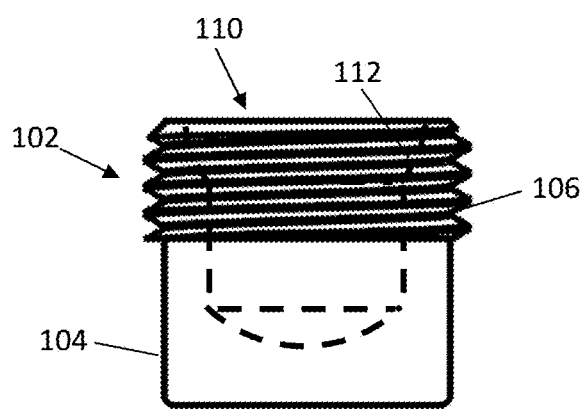
FIG. 10 is an elevation view of a cup of the swiveling device of FIG. 2

The swiveling device 100, in the illustrated embodiment, has a cup 102 (FIG. 10) by which the swiveling device 100 is connected to and supported entirely by the mounting assembly, a cap 120 adjustably engaging the cup 102, and a swivel element 150 (FIGS. 8,9) received by and trapped between the cup 102 and cap 120. The swivel element 150 is illustrated in FIG. 8 as shaped outwardly as a sphere having symmetric opposite cap portions removed to define a partial sphere outer engagement surface 152. An internally threaded mounting hole 154 is defined through the swivel element 150 to receive and engage the lower end 62 of the support post 52. Engagement of the support post 52 and swivel element 150 can be essentially fixed by a locking compound to effect the post 52 and element swivel element 150 functioning as rigid one-piece structure in use.

The cup 102 has an outwardly cylindrical lower end 104, the bottom face of which is connected to the forward end 40 the bracket 30 of the base assembly 20, for example by welding. The upper end of the cup has external threads 106 and an upward opening receptacle 110 for receiving the swivel element 150. The receptacle 110 has a concave inner contact surface 112 (shown in dashed line in FIG. 10) shaped as a spherical segment for engaging the swivel element 150.

Figure 7:
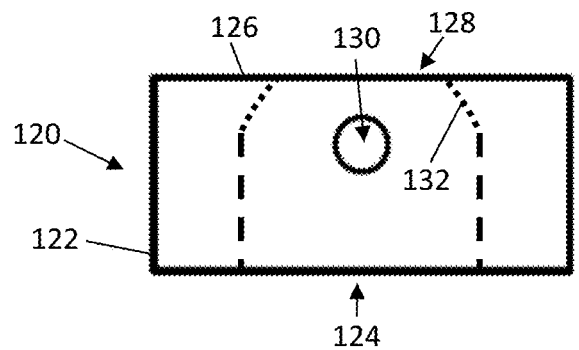
FIG. 7 is an elevation view of a cap of the swiveling device of FIG. 2.

The cup 102 and cap 120 are threadingly engaged to be loosened and tightened about the swivel element 150. The cap 120 has a lower end 122 with a threaded interior bore 124 (shown in dashed line in FIG. 7) for receiving and engaging the upper end of the cup 102. A top flange 126 of the cap 120 has a central circular opening 128 through which the support post 52 extends. The circular opening 128 has a diameter that is greater than the diameter of the support post 52 to permit tilting (partial yaw rotation 54 and partial pitch rotation 56 as referenced in FIG. 1). The partial sphere outer engagement surface 152 of the swivel element 150 has a diameter that is greater than the diameter of the circular opening 128 such that the swivel element 150 is trapped between the cup 102 and cap 120 when the cap 120 engages the cup 102. The top flange 126 has a concave inner contact surface 132 (shown in dashed line in FIG. 7) shaped as a spherical segment for engaging the swivel element 150.

Accordingly, the curvatures of the concave inner contact surfaces 112 and 132 of the cup 102 and cap 120 are selected to closely nestle respective portions of the partial sphere outer engagement surface 152 of the swivel element 150. The cap 120 engages the cup 102 by way of the threaded interior bore 124 engaging the external threads 106. The cap 120 is turned relative to the cup 102 to tighten the cup 102 assembly onto the swivel element 150 thereby locking the swiveling device 100, and the positions of the support post 52 and clamping device 50 therewith. This fixes any display item mounted thereon in a selected orientation. The cap 120 can be tightened onto the cup 102 and swivel element 150 by hand and can be further tightened by use of holes 130, formed therefor in the cylindrical outer wall of the cap 120 at diametrically opposed positions, for engaging a rod or other tool to provide additional torque.

Figure 6:
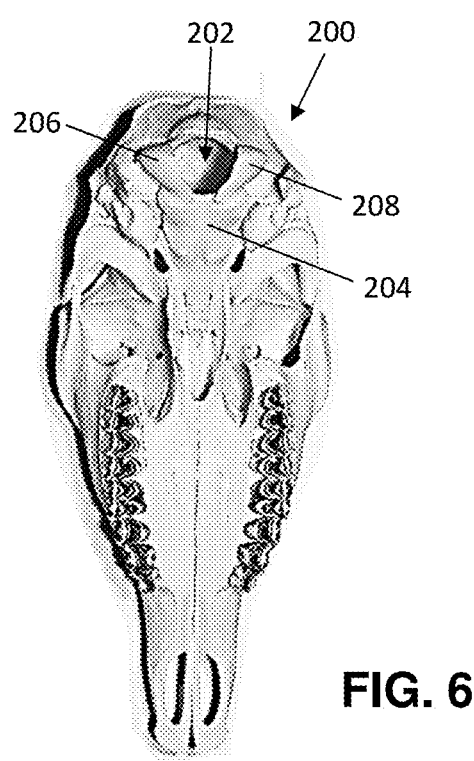
FIG. 6 is a view of the lower side of a game skull.

The clamping device 50 is configured to adjustably decrease the distance 68 (FIG. 2) between the first or upper jaw 66 and the cradle 80 to apply a clamping force therebetween upon an item to be displayed. The swiveling device 100 coupled to the clamping device 50 is configured to selectively permit and prevent swiveling adjustment of the position of the clamping device 50 independently of the distance between the upper jaw 66 and the cradle 80. For illustration and discussion of a display item upon which such use can be affected, the lower side of a game skull 200 is shown in FIG. 6 for illustration of bone features to which the clamping device 50 is well adapted to engage.

To mount the skull on the clamping device 50, the clamping device 50 should be loosened by turning the nut 70 and increasing the distance 68 (FIG. 2) between the upper jaw 66 and cradle 80 to permit the upper jaw 66 to enter the foramen magnum, which is the opening 202 in the occipital bone at the back of the skull 200. The clamping device 50 can then be tightened by turning the nut 70, thereby decreasing the distance between the upper jaw 66 and cradle 80, and clamping the basioccipital bone structure 204 forward of the opening 202 between the upper jaw 66 and lower jaw 82. This also engages the left and right contoured bone structures 206 and 208 (FIG. 6) laterally adjacent the opening with the upper faces of the inclined shoulder members 94 and 96, respectively. Once engaged with sufficient clamping force, the skull 200 will be supported from below by the cradle 80 and retained in stable fashion by the clamping device 50 overall.

Advantageously, the swiveling device 100 and clamping device 50 can each be adjusted (loosened and tightened) independently of the other. This permits, for example, a display item such as a skull or head prepared by taxidermy to be mounted securely with the clamping device 50 tightly engaged, and adjustment of the orientation of the display item by use of the swiveling device 100 without loosening or disengaging the clamping device 50, thereby minimizing any chance of dropping and damaging the display item during orientation adjustment. The mounting apparatus provides additional areas of contact between apparatus members and bone structures, with particular reference for example to the upper jaw 66 and lower jaw 82 clamping the basioccipital bone structure 204, and the shoulder members 94 and 96 supporting additional bone structures 206 and 208, thereby cradling and safely retaining a display item with distributed forces.

All dimensions and materials can be varied among embodiments of the mounting apparatus 10 within the scope of these descriptions and drawings. The following dimensions and materials are provided as non-limiting examples (exemplary dimensions are given in inches: in). The following dimension are particularly useful for a mounting apparatus 10 for a deer head or skull. Other dimensions, for example greater dimensions, may be implemented in a mounting apparatus 10 for use with larger species such as moose and elk.

| | |
|---|---|
| Mounting plate 22 | 3/16 in thick steel plate, 4-1/2 in tall, 2-1/2 in wide, 1/4 in holes with centers offset 9/32 in from ends |
| bracket 30 | 3/16 in thick steel plate, 3-1/4 in tall (edge 34), 4-7/16 in long |
| upper jaw 66 | 3/16 in thick steel plate, 2 in long, 1/2 in wide, bent with 7/32 in offset for 13/32 in effective height |
| cradle 80 | 3/16 in thick steel plate, 5/32 in through-hole 86, 1/2 in wide shoulders (94,96) and lower jaw 82, shoulders (94,96) inclined to 1-1/4 in effective height |
| swivel element 150 | 3/4 in diameter, 7/16 in height |
| washer 72 | 3/4 in diameter, 3/8 in center hole, 1/32 in thick |
| cap 120 | 1-1/2 in outer diameter, 21/32 in height, 11/16 in opening, 3/16 in holes 130 |
| cup 102 | 1 in diameter at threads, 7/8 in diameter at cylindrical lower end, 7/8 in tall, 1/2 in from threads to bottom face |

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A mounting apparatus for variably displaying an item, the mounting apparatus comprising:
    a clamping device comprising a first jaw, and a cradle, the clamping device configured to adjustably decrease a distance between the first jaw and the cradle to apply a clamping force therebetween upon an item to be displayed;
    a swiveling device coupled to the clamping device and configured to selectively permit and prevent swiveling adjustment of a position of the clamping device independently of the distance between the first jaw and the cradle; and
    a base assembly comprising a mounting plate for attachment to a host structure and a bracket extending from the mounting plate,
        wherein the bracket is connected to the mounting plate at a rearward end and extends outward from the mounting plate,
        wherein the swiveling device is connected to and supported by the bracket at a forward end of the bracket opposite the rearward end, and the clamping device is supported by the swiveling device, and
        wherein orientation of the bracket relative to the mounting plate is fixed.

2. The mounting apparatus of claim 1, wherein the cradle comprises a second jaw that opposes the first jaw, and a pair of lateral shoulders that are symmetric about the lower jaw.

3. The mounting apparatus of claim 2, wherein the lateral shoulders are inclined.

4. The mounting apparatus of claim 3, wherein the lateral shoulders diverge defining a fork that widens.

5. The mounting apparatus of claim 1, wherein the clamping apparatus comprises a support post along which the cradle is adjustably movable, wherein the first jaw is connected to the support post.

6. The mounting apparatus of claim 5, wherein the support post is received through a hole of the cradle thereby mounting the cradle to the support post.

7. The mounting apparatus of claim 5, further comprising a nut mounted on a threaded portion of the support post, wherein the nut rotatable on the support post to adjustably decrease the distance between the first jaw and the cradle to apply a clamping force therebetween.

8. The mounting apparatus of claim 7, wherein the support post is connected to the swiveling device, and wherein the nut is mounted on the support post between the swiveling device and cradle.

9. The mounting apparatus of claim 8, wherein the swiveling device, when loosened, permits three dimensional rotation adjustments of the support post.

10. The mounting apparatus of claim 9, wherein the swiveling device, when tightened, locks a position of the support post.

11. The mounting apparatus of claim 7, wherein the swiveling device comprises a swivel element shaped outwardly as at least a partial sphere, and wherein the support post is connected to the swivel element.

12. The mounting apparatus of claim 1, wherein the swiveling device comprises a cup, a cap adjustably engaging the cup, and a swivel element trapped between the cup and the cap, wherein the clamping device is connected to the swivel element.

13. The mounting apparatus of claim 12, wherein the swivel element is shaped outwardly as at least a partial sphere, and wherein at least one of the cup and the cap comprises a concave inner contact surface for engaging the swivel element.

14. The mounting apparatus of claim 12, wherein the cap comprises a flange having a central circular opening through which a support post of the clamping device extends.

15. The mounting apparatus of claim 12, wherein:
    the cup and cap are threadingly engaged; and
    the cup and cap can be loosened and tightened about the swivel element by relative rotation.

16. The mounting apparatus of claim 15, wherein:
    the swiveling device, when the cup and cap are loosened, permits three dimensional rotation adjustments of the clamping device; and the swiveling device, when the cup and cap are tightened, locks a position of the clamping device.

\* \* \* \* \*